United States Patent [19]

Dralle-Voss et al.

[11] Patent Number: 5,766,273
[45] Date of Patent: Jun. 16, 1998

[54] POLYMER BLENDS AND THEIR USE AS ADDITIVES FOR MINERAL OIL MIDDLE DISTILLATES

[75] Inventors: Gabriele Dralle-Voss, Darmstadt; Knut Oppenländer, Ludwigshafen; Bernd Wenderoth, Birkenau; Dieter Faul, Niederkirchen; Wolfgang Kasel, Nussloch, all of Germany

[73] Assignee: BASF Aktiengesellschaft, Ludwigshafen, Germany

[21] Appl. No.: 793,333

[22] PCT Filed: Aug. 12, 1995

[86] PCT No.: PCT/EP95/03207

§ 371 Date: Feb. 25, 1997

§ 102(e) Date: Feb. 25, 1997

[87] PCT Pub. No.: WO96/06902

PCT Pub. Date: Mar. 7, 1996

[30] Foreign Application Priority Data

Aug. 26, 1994 [DE] Germany ............ 44 30 294.0

[51] Int. Cl.⁶ .................................................. C10L 1/22
[52] U.S. Cl. .................. 44/346; 44/393; 44/397; 525/178; 525/183; 525/240; 525/445; 525/55
[58] Field of Search ................ 44/346, 393, 397; 525/178, 183, 240, 445, 55

[56] References Cited

U.S. PATENT DOCUMENTS

| | | |
|---|---|---|
| 3,413,104 | 11/1968 | Mehmedbasich ............ 44/346 |
| 3,449,236 | 6/1969 | Engelhart ................... 44/346 |
| 3,471,458 | 10/1969 | Mehmedbasich . |
| 3,638,349 | 2/1972 | Wisotsky et al. ............ 44/393 |
| 3,715,368 | 2/1973 | Mehmedbasich ............ 44/346 |
| 3,909,215 | 9/1975 | Kray ......................... 44/346 |
| 4,010,006 | 3/1977 | Price ......................... 44/395 |
| 4,090,946 | 5/1978 | Nottes et al. ............... 44/346 |
| 4,211,534 | 7/1980 | Feldman ..................... 44/397 |
| 4,416,668 | 11/1983 | Thompson ................... 44/346 |
| 4,664,676 | 5/1987 | Denis et al. ................ 44/392 |
| 4,985,048 | 1/1991 | Wirtz et al. ................ 44/394 |

FOREIGN PATENT DOCUMENTS

| | | |
|---|---|---|
| A 0 290 088 | 11/1988 | European Pat. Off. . |
| A 0 320 766 | 6/1989 | European Pat. Off. . |
| A 0 455 206 | 11/1991 | European Pat. Off. . |
| 0 320 766 B1 | 1/1994 | European Pat. Off. . |
| A 2 567 536 | 1/1986 | France . |
| A 2 592 387 | 7/1987 | France . |
| 31 37 233 C2 | 6/1982 | Germany . |
| A 2 261 441 | 5/1993 | United Kingdom . |
| 8900180 | 1/1989 | WIPO . |

*Primary Examiner*—Jerry D. Johnson
*Attorney, Agent, or Firm*—Oblon, Spivak, McClelland, Maier & Neustadt, P.C.

[57] ABSTRACT

Polymer blends contain a) from 10 to 90% by weight of an imide of a copolymer based on an α-olefin and on an ethylenically unsaturated dicarboxylic acid and a polyamine and b) from 10 to 90% by weight of a copolymer which differs from a) and contains at least two monomers selected from the group consisting of ethylene, acrylates, vinyl esters, vinyl ethers and ethylenically unsaturated dicarboxylic acids or dicarboxylic acid derivatives, and are used as additives for mineral oil middle distillates.

8 Claims, No Drawings

POLYMER BLENDS AND THEIR USE AS ADDITIVES FOR MINERAL OIL MIDDLE DISTILLATES

The invention relates to polymer blends containing a) from 10 to 90% by weight of an imide of a copolymer based on an α-olefin and on an ethylenically unsaturated dicarboxylic acid and a polyamine and b) from 10 to 90% by weight of a copolymer which differs from a) and contains at least two monomers selected from the group consisting of ethylene, acrylates, vinyl esters, vinyl ethers and ethylenically unsaturated dicarboxylic acids or dicarboxylic acid derivatives, and their use as additives for mineral oil middle distillates.

Middle distillates, such as gas oils, diesel fuels or fuel oils, which are obtained from mineral oils by distillation, have different paraffin contents, depending on the origin of the crude oil. At relatively low temperatures, solid paraffins separate out (cloud point, CP). On further cooling, the lamellar n-paraffin crystals form a house-of-cards structure and the middle distillate sets although the predominant part of the middle distillate is still liquid. The flow of the fuels based on mineral oil distillates is very adversely affected by the precipitated n-paraffins at a temperature range between cloud point and pour point. The paraffins block filters and result in a non-uniform fuel supply to the combustion units or completely stop said supply. Similar problems occur in the case of fuel oils.

It has long been known that the crystal growth of the paraffins in the heating and power fuels based on mineral oil middle distillates can be modified by suitable additives. The effective additives prevent middle distillates from forming such house-of-cards structures and from becoming solid at temperatures only a few degrees Celsius below the temperature at which the first paraffin crystals are formed. Instead, fine, well crystallized, separate paraffin crystals are formed which pass through filters in motor vehicles and heating systems or at least form a filter cake which is permeable to the liquid part of the middle distillates, so that trouble-free operation is ensured.

A disadvantage of these additives is that the precipitated paraffin crystals have a higher density than the liquid part and therefore tend to settle out to an increasing extent on the bottom of the container during storage. This results in the formation of a homogeneous low-paraffin phase in the upper part of the container and a two-phase paraffin-rich layer at the bottom. Since the middle distillate is generally taken off slightly above the bottom of the container, both in vehicle tanks and in the mineral oil dealer's storage or delivery tanks, there is the danger that the high concentration of solid paraffins will lead to blockages of filters and metering apparatuses. This danger is all the greater the further the storage temperature falls below the separation temperature of the paraffins, since the amount of paraffin which separates out increases with decreasing temperature.

The paraffin crystal modifiers, ie. the flow improvers or paraffin dispersants, are generally polymers which modify the crystal growth of the n-paraffins by cocrystallization (interaction) and improve the flow properties of the middle distillate at low temperatures. According to DIN EN 116, the efficiency of the flow improvers is expressed indirectly by measurement of the cold filter plugging point (CFPP).

Ethylene/vinyl carboxylate copolymers, as disclosed, for example, in U.S. Pat. No. 3,048,479 and U.S. Pat. No. 3,627,838, have long been used as flow improvers.

U.S. Pat. No. 3,471,458 discloses alternating copolymers of maleimides and olefins of not less than 8 carbon atoms, which are used as dispersants and detergents in heating fuels. The alternating copolymers consist in particular of aliphatic 1-olefins of 8 to 30 carbon atoms and N-substituted maleimides in which the radicals forming the imide group are nonaromatic and contain 3 to 60 carbon atoms and 1 to 5 amino nitrogen atoms, the copolymer having from 4 to 20 repeating units.

In U.S. Pat. No. 3 471 458, the imide group is in particular a radical of the formula

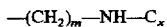

where $C_x$ is an alkyl in which x is 8 to 20 carbon atoms and m is 2 or 3.

DE-C-31 37 233 protects compositions for improving the cold filtration properties of middle mineral oil cuts having an initial distillation temperature of from 200° to 230° C. and a final distillation temperature of from 390° to 450° C. (according to ASTM), which contain:

(A) a conventional polyethylene or a conventional copolymer of ethylene and vinyl acetate having a number average molecular weight of from 500 to 4000 and (B) a condensate of maleic anhydride or succinic anhydride with a linear N-alkyl-1,3-diaminopropane of the general formula

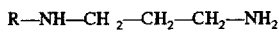

where R is saturated or unsaturated $C_{10}$–$C_{22}$—alkyl, the molar ratio A:B being from 1:20 to 20:1.

EP-B-0 320 766 describes polymer blends comprising a copolymer ($A_1$) of 10–60% by weight of vinyl acetate and 40–90% by weight of ethylene or a copolymer ($A_2$) of 15–50% by weight of vinyl acetate, 0.5–20% by weight of a $C_6$–$C_{24}$-α-olefin and 30–70% by weight of ethylene and a copolymer (B) of 10–90% by weight of a $C_6$–$C_{24}$-α-olefin and 10–90% by weight of an N-$C_6$–$C_{22}$-alkylmaleimide, the mixing ratio of the copolymers ($A_1$) or ($A_2$) to (B) being from 100:1 to 1:1. These are used for improving the flow of mineral oil distillates at low temperatures.

It is an object of the present invention to provide copolymers which ensure the flow of mineral oil middle distillates at low temperature in that they have a dispersant action so that settling of the paraffins which have separated out is delayed or prevented. This action should be independent of the composition of the mineral oil middle distillates.

We have found that this object is achieved by the polymer blends defined at the outset.

The present invention furthermore relates to the use of these polymer blends as additives for mineral oil middle distillates and to mineral oil middle distillates containing these polymer blends.

The novel polymer blends contain, as essential component, from 10 to 90, preferably from 20 to 75, particularly preferably from 25 to 60, % by weight of an imide of a copolymer based on an α-olefin and on an ethylenically unsaturated dicarboxylic acid and a polyamine (component a), which is also referred to below as copolymer a)). The copolymers a) have in general a weight average molecular weight of from 200 to 50,000, preferably from 500 to 20,000. The copolymers a) preferably contain from 30 to 70, particularly preferably from 40 to 60, mol % of an α-olefin and 30 to 70, particularly preferably from 40 to 60, mol % of an imide of an ethylenically unsaturated dicarboxylic acid and a polyamine, the percentages in each case based on a). An alternating copolymer having equal molar amounts of imide and α-olefin is very particularly preferred.

Branched or straight-chain α-olefins of the general formula III

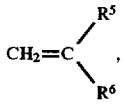

where $R^5$ is hydrogen or $C_1$–$C_{10}$-alkyl and $R^6$ is alkyl, alkenyl or aryl, are generally used. For example, α-olefins, such as 1-butene, 1-hexene, 1-octene, 1-decene, 1-dodecene, 1-tetradecene, 1-hexadecene or 1-octadecene, or mixtures of 1-alkenes with polyethylene derivatives having 20–24 or 24–28 carbon atoms or a longer chain and a terminal C—C double bond are suitable. Polymeric propene, butene and isobutene derivatives which have an unsaturated terminal group are also useful. Aryl-substituted olefins, eg. styrene, are also suitable.

α-Olefins having chain lengths of from $C_{12}$ to $C_{40}$, in particular straight-chain α-olefins having chain lengths of from $C_{12}$ to $C_{28}$, and especially those having chain lengths of from $C_{16}$ to $C_{24}$ are preferred.

According to the invention, $C_{20-C24}$-α-olefins are very particularly preferably used. These are in general mixtures of α-olefins which contain more than 80% by weight of α-olefins of 20 to 24 carbon atoms.

The novel copolymers a) may furthermore contain up to 10 mol % of at least one further ethylenically unsaturated monomer. Examples of suitable monomers are acrylic acid, methacrylic acid, esters derived therefrom and stearyl vinyl esters, vinyl ethers and vinyl esters.

Examples of suitable ethylenically unsaturated dicarboxylic acids on which the copolymers a) are based are monoethylenically unsaturated dicarboxylic acids of 4 to 8 carbon atoms, eg. maleic acid, itaconic acid, mesaconic acid, citraconic acid and methylenemalonic acid. Among the stated acids, maleic acid and itaconic acid are preferred, the former being very particularly preferred.

For the preparation of the imides, it is of course also possible to use the corresponding dicarboxylic esters or dicarboxylic anhydrides in addition to the dicarboxylic acids.

The ethylenically unsaturated dicarboxylic acids or dicarboxylic acid derivatives which are preferred according to the invention for this purpose can be summarized by the general formula III

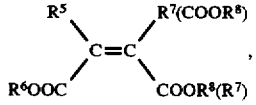

where $R^5$ to $R^8$, independently of one another, are each hydrogen or $C_1$–$C_{22}$-alkyl which may contain heteroatoms, the corresponding anhydrides also being permitted in the case of cis-dicarboxylic acids of the formula III (where $R^6$ and $R^8$ are each H).

As a rule, it is advantageous to use the dicarboxylic acid derivatives in the form of the anhydrides in the copolymerization. The anhydride groups of the initially formed copolymers can then be reacted directly with the polyamines.

Examples of these are maleic anhydride, itaconic anhydride, citraconic anhydride and methylenemalonic anhydride.

For the purposes of the present invention, polyamines are amines which contain at least two nitrogen atoms.

According to the invention, polyamines of the formula I

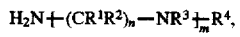

where
n is from 1 to 6;
m is from 1 to 3;
$R^1$ and $R^2$ independently of one another are each hydrogen, methyl or ethyl;
$R^3$ is hydrogen, alkenyl, alkyl or aryl and
$R^4$ is hydrogen, alkyl, alkenyl, aryl, amino-containing alkenyl or amino-containing alkyl,
are preferably used.

Examples of polyamines of the formula I which are suitable according to the invention are N-cyclohexyl-1,3-propylenediamine; N-2-ethylhexyl-1,3-propylene-diamine; N-dodecyl-1,3-propylenediamine; N-stearyl-1,3-propylenediamine; N-oleyl-1,3-propylenediamine; N-3-aminopropyl-tallow fatty amine; N-archedyl-1,3-propylenediamine; N-behenyl-1,3-propylenediamine; N-benzyl-1,3-propylenediamine; N-phenyl-1,3-propylenediamine; 2-aminoethylstearylamine; 2-aminoethylbehenylamine; 2-aminoethyloleylamine; 2-aminoethyl-tallow fatty amine; N-stearylbishexamethylene-1,6-diamine; N-stearyldipropylenetriamine; N-dodecyldipropylenetriamine; 1-N,N-dimethylamino-3-propylamine; N,N-ditridecyl-1,3-propylenediamine; N,N-bis(2-ethylhexyl)-3-aminopropyleneamine; bis-aminopropyl-tallow fatty amine; bis-aminopropyllaurylamine, 1-(2-aminopropyl)stearylamine; 1-(2-aminopropyl)piperazine; N-2-aminoethylpiperidine; N-3-aminopropylimidazole.

According to the invention, polyamines of the formula II

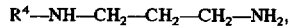

where $R^4$ is alkyl, alkenyl, aryl, amino-containing alkyl, amino-containing alkenyl or hydrogen, are particularly preferably used. Among these, N-tallow fatty-1,3-diaminopropane is particularly suitable.

Here, N-tallow fatty-1,3-diaminopropane is in particular a mixture of diamines of the formula II which differ in the alkyl radical $R^4$. The distribution of the alkyl radicals is roughly 1% by weight of $C_{12}$, 3% by weight of $C_{14}$, 30% by weight of $C_{16}$, 25% by weight of $C_{18}$, 40% by weight of $C_{18}$ (having a double bond) and 1% by weight of $C_{20}$–$C_{22}$.

In a preferred embodiment of the invention, component a) is the imide which is derived from a $C_{20}$–$C_{24}$-α-olefin/maleic anhydride copolymer and a polyamine.

The secondary or tertiary amino groups contained in the copolymers a) may also be present in quaternized form, for example the imides are reacted with inorganic or organic acids or are alkylated with known alkylating reagents. Here, alkylation is understood as, in particular, the introduction of an alkyl, alkenyl or hydroxyalkyl group. Corresponding opposite ions would be, for example, the anions of an organic or inorganic acid, eg. $CH_3OSO_3^-$, $SO_4^{2-}$ or alk(en)yl-$CO_2^\ominus$.

The novel polymer blends contain, as a further essential component, from 10 to 90, preferably from 25 to 80, particularly preferably from 40 to 75, % by weight of a copolymer which contains at least two monomers selected from the group consisting of ethylene, acrylates, vinyl esters, vinyl ethers and ethylenically unsaturated dicarboxylic acids or dicarboxylic acid derivatives (component b).

The novel copolymers of component b) may contain, for example, from 10 to 90, preferably from 15 to 45, mol % of at least one acrylate, one vinyl ester, one vinyl ether, one ethylenically unsaturated dicarboxylic acid or one dicarboxylic acid derivative as polymerized units.

Such copolymers are described, for example, in DE-A-19 14 756 and EP-A-486 836 (ethylene/vinyl ester copolymers and blends thereof with other copolymers), EP-A-214 876 (α-olefin/maleic anhydride copolymers) or EP-A-155 807 (alkyl fumarate/vinyl acetate copolymers).

In addition, the copolymers b) may also contain further comonomers.

A preferred component b) is a copolymer which contains at least the monomers ethylene and vinyl ester. An ethylene/vinyl propionate copolymer is particularly preferably used as component b).

The preparation of components a) and b) is carried out in general by copolymerization in a manner known per se, in inert organic solvents under free radical conditions. Solvents which virtually do not intervene at all in the polymerization and do not react with the monomers are particularly suitable. Such solvents, which may be used alone or as a mixture, are, for example, acetone, methyl ethyl ketone, diethyl ketone, cyclohexanone, tetrahydro-furan, dioxane, ethyl acetate, ethyl propionate, aromatic hydrocarbons, such as benzene, toluene, xylene, cumene, tetralin or solvent naphtha (eg. Solvesso® 150), aliphatic hydrocarbons, such as pentane, hexane, heptane, octane, isooctane, cyclohexane, decalin or Shellsol® D70, and halogenated aliphatic hydrocarbons, such as dichloromethane, dichloroethane or trichloroethane. Solvesso® 150 is EXXON Chemical GmbH's name for an aromatic solvent fraction boiling within the range from 187° to 203° C. It contains about 99% of aromatics. Shellsol® D70 is Shell's name for a dearomatized, aliphatic hydrocarbon mixture boiling within the range from 195° to 245° C.

Acetone, methyl ethyl ketone, toluene, xylene, tetralin, decalin, solvent naphtha (eg. Solvesso® 150) or Shellsol® D70 is preferably used as the solvent.

The copolymerizations are carried out as a rule in the presence of compounds which decompose into free radicals under the polymerization conditions. Examples of suitable polymerization initiators are hydrogen peroxide, organic peroxides and hydro-peroxides, azo compounds and peroxo disulfates. The polymerization may also be effected by the action of high-energy radiation or by irradiating the reaction mixture in the presence of a photoinitiator, for example benzoin.

At polymerization temperatures chosen, the initiators should preferably have a half life of <3 hours. Preferably used polymerization initiators are tert-butyl perpivalate, dilauryl peroxide, tert-butyl per-2-ethylhexanoate (tert-butyl peroctoate), tert-butyl perbenzoate, dicumyl peroxide, di-tert-butyl peroxide and 2,2'-azobis(2-methylpropionitrile), alone or as a mixture. The half lives of the stated peroxides can be reduced by the concomitant use of redox coinitiators, for example benzoin or dimethylaniline, and of complexes or salts of heavy metals, such as copper, cobalt, manganese, iron, nickel or chromium, which complexes or salts are soluble in organic solvents.

The polymerization initiators which decompose to give free radicals are used in the usual amounts, for example from 0.1 to 5.0% by weight, based on the amounts of monomers used in the polymerization.

The particular copolymerization can be carried out in the presence or absence of conventional regulators, such as mercaptoethanol, mercaptopropanol, mercaptoacetic acid, mercaptopropionic acid, thiolactic acid, n-butyl mercaptan, tert-butyl mercaptan, octyl mercaptan and dodecyl mercaptan. Further suitable regulators are aldehydes, such as acetaldehyde, propionaldehyde and butyraldehyde, and formic acid.

The polymerization is preferably carried out in a stirred kettle, which is equipped, for example, with an anchor stirrer, paddle stirrer or impeller stirrer. The copolymerization can be carried out, for example, as a solution, precipitation or suspension polymerization. In the precipitation and suspension polymerization, it may be advantageous to effect polymerization additionally in the presence of protective colloids. Examples of suitable protective colloids are copolymers of maleic anhydride and vinyl alkyl ethers which contain 1 to 20 carbon atoms in the alkyl group, or copolymers of maleic anhydride and olefins of 8 to 20 carbon atoms and monoesters thereof with $C_{10}$–$C_{20}$-alcohols or monoamides with $C_{10}$–$C_{20}$-amines. Polyalkyl vinyl ethers whose alkyl group contains 1 to 20 carbon atoms, for example polymethyl, polyethyl and polyisobutyl vinyl ether, are also suitable. If a protective colloid is used in the copolymerization, the effective amounts are from 0.05 to 4.0% by weight, based on the monomers to be polymerized.

The concentration of the monomers in the inert organic solvents is in general from 5 to 80, preferably from 15 to 60, % by weight. The polymerization temperature is as a rule from 40° to 240° C., preferably from 80° to 180° C.

After the end of the polymerization, the copolymers can be isolated, for example by distilling off the solvent used in the polymerization or by precipitating the polymers with a suitable solvent. The copolymers then remain as a pulverulent residue.

Component a) is obtainable, for example, by polymerization of the α-olefins suitable according to the invention and unsaturated imides in solution in the presence of free radical initiators, such as azobisisobutyronitrile.

However, the copolymers of component a) are preferably obtained by reacting the copolymers of α-olefins, ethylenically unsaturated dicarboxylic acid derivatives and, if required, further monomers with the polyamines. The amine is used in amounts of about 1 mol per mole of polymerized dicarboxylic acid derivative, for example 0.8–1.2 mol/mol. In the reaction, the copolymer with the polyamine is heated with or without a solvent in general for from 0.3 to 30 hours at from 100° to 180° C. The solvents should preferably have no acidic hydrogen atoms which could react with the copolymers. Aromatic hydrocarbons, for example toluene, xylene or solvent naphtha, or aliphatic hydrocarbons, for example cyclohexane, decalin or Shellsol® K, are preferably used. If required, the reaction can be accelerated by acidic or basic catalysts, for example p-toluenesulfonic acid, sodium methylate, sulfuric acid, phosphorous acid, citric acid, potassium tert-butylate or tetrabutyl orthotitanate. Water of reaction formed during the reaction is preferably distilled off.

The reaction to the imide a) can be monitored by IR spectroscopy on the basis of the resulting imide band at 1700 $cm^{-1}$.

Component b) is preferably prepared by a high-pressure process in a tube reactor in the absence of a solvent (cf. DE-C 21 02 469, page 2, line 35 et seq.).

The weight average molecular weight of the novel copolymers a) is in general from 200 to 50,000, preferably from 500 to 20,000, and that of the copolymers b) is in general from 500 to 5000, preferably from 1000 to 3000.

The novel polymer blends can be prepared by simple mixing of the components a) and b).

The novel polymer blends are used as additives for mineral oil middle distillates, which are understood to include petroleum, fuel oil and diesel fuels having a boiling point of from about 150° to 400° C. The polymer blends can be added directly to the middle distillates but are preferably added as a 20–70% strength by weight solution. Suitable solvents are aliphatic or aromatic solvents, such as xylene or mixtures thereof, and high-boiling mixtures of aromatics, as well as middle distillates. The amount of polymer blend in the mineral oil middle distillates is as a rule from 10 to 10,000, preferably from 20 to 5000, particularly preferably from 50 to 1000, ppm. Depending on the intended use, the middle distillates may contain further additives, for example flow improvers, dispersants, antifoams, corrosion inhibitors, antioxidants, demulsifiers, lubricity improvers, conductivity improvers and/or dyes.

In middle distillates, the novel polymer blends, independently of their origin, result in a substantial improvement in the low-temperature flow properties by effectively keeping precipitated paraffin crystals in suspension so that blockage of filters and pipes by paraffin which has settled out does not occur. They have a broad action and ensure that the paraffin crystals which have separated out are very well dispersed in different middle distillates.

EXAMPLES

In the Examples which follow, percentages are by weight.

In each of the Examples according to the invention, polymer blends comprising the copolymers A1 to A6 (component a) and F1, an ethylene/vinyl propionate copolymer containing about 40% by weight of vinyl propionate and having a weight average molecular weight of 2500 (component b), were used.

In each of the Comparative Examples, polymer blends comprising the copolymers A7 and A8 in combination with F1 were used. In addition, the copolymers A1 and F1 were each used alone in two further comparative examples.

A) Preparation of the copolymers A1 to A6 (component a) and of copolymers A7 and A8

The maleic anhydride/$C_{20}$–$C_{24}$-α-Olefin copolymer used contained the two monomers in equal molar amounts and had a weight average molecular weight of 10,000.

A1) 255 g of a 50% strength solution of a maleic anhydride /C20,24-olefin copolymer were slowly heated to 160° C. with 100.2 g of aminopropyl-tallow fatty amine (Duomeen® T from Akzo). The solution was stirred for a few hours at this temperature under a stream of nitrogen and the water from the condensation reaction was distilled off. After 2 hours, the acid number of the product was 5.4 mg KOH/g. In the IR spectrum, the imide band at 1700 $cm^{-1}$ was clearly detectable. The product obtained was diluted with 75 g of Solvesso® 150 so that the solids content of the product was 50%.

A2) 255 g of a 50% strength solution of a maleic anhydride /C20,24-olefin copolymer were slowly heated to 160° C. with 110 g of aminopropylarachidyl-behenylamine (Dinoram® 42 from CECA). The solution was stirred for a few hours at this temperature under a stream of nitrogen and the water from the condensation reaction was distilled off. After 2 hours, the acid number of the product was 6.6 mg KOH/g. In the IR spectrum, the imide band at 1700 $cm^{-1}$ was clearly detectable. The product obtained was diluted with 75 g of Solvesso® 150 so that the solids content of the product was 52.7%.

A3) 255 g of a 50% strength solution of a maleic anhydride/C20,24-olefin copolymer were slowly heated to 160° C. with 83 g of aminopropyldodecylamine (Duomeen® C from Akzo). The solution was stirred for a few hours at this temperature under a stream of nitrogen and the water from the condensation reaction was distilled off. After 3 hours, the acid number of the product was 4.1 mg KOH/g. In the IR spectrum, the imide band at 1700 $cm^{-1}$ was clearly detectable. The product obtained was diluted with 75 g of Solvesso® 150 so that the solids content of the product was 50%.

A4) 255 g of a 50% strength solution of a maleic anhydride /C20,24-olefin copolymer were slowly heated to 160° C. with 103 g of aminopropyloleylamine (Duomeen® O from Akzo). The solution was stirred for a few hours at this temperature under a stream of nitrogen and the water from the condensation reaction was distilled off. After 2 hours, the acid number of the product was 6.2 mg KOH/g. In the IR spectrum, the imide band at 1700 $cm^{-1}$ was clearly detectable. The product obtained was diluted with 75 g of Solvesso® 150 so that the solids content of the product was 52.9%.

A5) 30 g of a 50% strength solution of A1 were slowly heated to 80° C. with 2.6 g of dimethyl sulfate. The solution was stirred for a few hours at this temperature. After 20 hours, the dimethyl sulfate had completely reacted and no more dimethyl sulfate was detectable in the mixture. The product obtained had a solids content of 50.5%.

A6) 0.65 g of acetic acid was added to 30 g of A1 and the solution was then stirred for 3 hours. The product obtained had a solids content of 49%.

A7) Imide from alkylamine (comparison) 122 g of a 50% strength solution of a maleic anhydride/C20,24-olefin copolymer were slowly heated to 160° C. with 40.4 g of tallow fatty amine. The solution was stirred for a few hours at this temperature under a stream of nitrogen and the water from the condensation reaction was distilled off. After 4 hours, the acid number of the product was 5 mg KOH/g. In the IR spectrum, the imide band at 1700 $cm^{-1}$ was clearly detectable. The product obtained was diluted with 70 g of Solvesso 150® so that the solids content of the solution was 45.5%.

A8) Monoamide with secondary amine (comparison) 81 g of a 50% strength solution of a maleic anhydride/C20, 24-olefin copolymer were slowly heated to 120° C. with 50.5 g of hydrogenated ditallow fatty amine. The solution was stirred for a few hours at this temperature under a stream of nitrogen. After 4 hours, the acid number of the product was 56 mg KOH/g. The transformation in the anhydride band at 1780 $cm^{-1}$ could be monitored by IR spectroscopy. The product obtained was diluted with 20 g of Solvesso® 150 so that the solids content of the product was 61%.

B. Use Examples

The novel polymer blends, the polymer blends of the Comparative Examples and the individual copolymers were tested in a number of mineral oil middle distillates. These were diesel fuels of commercial German refinery quality; they were referred to as DK 1, DK 2, DK 3 and DK 4:

|  | DK 1 | DK 2 | DK 3 | DK 4 |
| --- | --- | --- | --- | --- |
| Cloud point CP (°C.) | −8 | −5 | −7 | −7 |
| CFPP (°C.) | −10 | −8 | −12 | −10 |

-continued

|  | DK 1 | DK 2 | DK 3 | DK 4 |
|---|---|---|---|---|
| Density at 20° C. (g/ml) | 0.831 | 0.838 | 0.817 | 0.832 |
| Initial boiling point (°C.) | 175 | 167 | 165 | 172 |
| 20% boiling point (°C.) | 223 | 221 | 201 | 219 |
| 90% boiling point (°C.) | 314 | 328 | 320 | 322 |
| Final boiling point (°C.) | 352 | 361 | 353 | 355 |

The amounts of copolymers A1 to A8 and/or F1 shown in the Tables were added at 40° C. to the stirred middle distillates, which were then cooled to room temperature.

The additive-containing middle distillates were cooled from room temperature to −13° C. in 500 ml glass cylinders in a cold bath and were stored for 20 hours at this temperature. The amount and appearance of the paraffin phase was then determined and evaluated visually. The cold filter plugging point (CFPP) according to DIN EN 116 and the cloud point (CP) according to ASTM D 2500 were determined for the 20% by volume of sediment phase separated off at −13° C. from each sample.

The results are shown in Tables 1 to 4. In addition to the visual evaluation, the good agreement between the CP of the 20% by volume sediment phase and the CP of the particular middle distillate shows that complete dispersing of the n-paraffins was almost always achieved when the novel polymer blends were used.

On the other hand, Tables 2 and 4 show that the components a) and b) of the novel polymer blends alone have no dispersing action at all.

This shows that the maleamide/α-olefin copolymers (component a) prepared using polyamines, in combination with the copolymer F1 (component b), result in very good dispersing of the n-paraffins. In contrast, a combination of the similar imides of primary alkylamines with F1 or of the monoamides of dialkylamines with F1 have virtually no effect as paraffin dispersants.

TABLE 1

Dispersing tests in DK 1, CP: −8° C., CFPP: −10° C.

| Example | A/Dose (ppm) | F1 Dose (ppm) | CFPP (°C.) | Paraffin phase (% by vol.) | Appearance | 20% Sediment phase CFPP (°C.) | CP (°C.) |
|---|---|---|---|---|---|---|---|
| 1 | A1/200 | 400 | −28 | 100 | dispersed | −28 | −9 |
| 2 | A2/200 | 400 | −23 | 88 | dispersed | −24 | −5 |
| 3 | A3/200 | 400 | −27 | 100 | dispersed | −25 | −9 |
| 4 | A4/200 | 400 | −27 | 100 | dispersed | −26 | −9 |
| 5 | A5/300 | 300 | −19 | 100 | dispersed | −20 | −9 |
| 6 | A6/300 | 300 | −19 | 98 | dispersed | −20 | −10 |
| Comparison 1 | A7/200 | 400 | −25 | 46 | settled out | −23 | −6 |
| Comparison 2 | A8/200 | 400 | −26 | 22 | settled out | −15 | −4 |

TABLE 2

Dispersing tests in DK 2, CP: −5° C., CFPP: −8° C.

| Example | A/Dose (ppm) | F1 Dose (ppm) | CFPP (°C.) | Paraffin phase (% by vol.) | Appearance | 20% sediment phase CFPP (°C.) | CP (°C.) |
|---|---|---|---|---|---|---|---|
| 7 | A1/200 | 400 | −20 | 100 | dispersed | −21 | −6 |
| 8 | A3/200 | 400 | −21 | 100 | dispersed | −24 | −5 |
| 9 | A4/200 | 400 | −22 | 100 | dispersed | −20 | −5 |
| 10 | A5/300 | 300 | −17 | 100 | dispersed | −15 | −3 |
| 11 | A6/300 | 300 | −17 | 100 | dispersed | −17 | −6 |
| Comparison 3 | A7/200 | 400 | −23 | 46 | settled out | −11 | −4 |
| Comparison 4 | A8/200 | 400 | −20 | 22 | settled out | −12 | 0 |
| Comparison 5 | A1/200 | — | −8 | 26 | settled out | −1 | −1 |
| Comparison 6 | — | 400 | −24 | 42 | settled out | −17 | −1 |

TABLE 3

Dispersing tests in DK 3, CP: −7° C., CFPP: −12° C.

| Example | A/Dose (ppm) | F1 Dose (ppm) | CFPP (°C.) | Paraffin phase (% by vol.) | Appearance | 20% Sediment phase CFPP (°C.) | CP (°C.) |
|---|---|---|---|---|---|---|---|
| 12 | A1/200 | 400 | −23 | 100 | dispersed | −18 | −5 |
| 13 | A3/200 | 400 | −22 | 100 | dispersed | −17 | −5 |
| 14 | A4/200 | 400 | −23 | 100 | dispersed | −20 | −5 |
| Comparison 7 | A7/200 | 400 | −21 | 30 | settled out | −6 | −2 |
| Comparison 8 | A8/200 | 400 | −22 | 16 | settled out | −5 | 0 |

TABLE 4

| | | | | Dispersing tests in DK 4, CP: -7° C., CFPP: -10° C. | | | |
|---|---|---|---|---|---|---|---|
| | A/Dose | F1 Dose | CFPP | Paraffin phase | | 20% Sediment phase | |
| Example | (ppm) | (ppm) | (°C.) | (% by vol.) | Appearance | CFPP (°C.) | CP (°C.) |
| 15 | A1/200 | 400 | -21 | 92 | dispersed | -21 | -7 |
| 16 | A3/200 | 400 | -19 | 100 | dispersed | -21 | -7 |
| 17 | A4/200 | 400 | -20 | 100 | dispersed | -20 | -7 |
| Comparison 9 | A7/200 | 400 | -23 | 40 | settled out | -23 | -4 |
| Comparison 10 | A8/200 | 400 | -23 | 30 | settled out | -10 | -1 |
| Comparison 11 | A1/200 | — | -9 | 12 | settled out | -2 | -2 |
| Comparison 12 | — | 400 | -23 | 36 | settled out | -18 | -1 |

We claim:

1. a polymer blend containing
   a) from 10 to 90% by weight of an imide of a copolymer based on an α-olefin and on an ethylenically unsaturated dicarboxylic acid, which may furthermore contain up to 10 mol % of at least one further ethylenically unsaturated monomer selected from acrylic acid, methacrylic acid, esters derived therefrom or vinyl esters, and a polyamine and
   b) from 10 to 90% by weight of a copolymer which differs from a) and contains at least two monomers selected from ethylene, acrylates, vinyl esters, vinyl ethers, ethylenically unsaturated dicarboxylic acids, dicarboxylic acid esters or dicarboxylic anhydrides.

2. A polymer blend as claimed in claim 1, wherein the polyamine used is an amine of the formula I $$H_2N\text{---}(CR^1R^2)_n\text{---}NR^3\text{---}_m R^4, \qquad I$$

where
   n is from 1 to 6;
   m is from 1 to 3;
   R$^1$ and R$^2$ independently of one another are each hydrogen, methyl or ethyl;
   R$^3$ is hydrogen, alkenyl, alkyl or aryl and
   R$^4$ is hydrogen, alkyl, alkenyl, aryl, amino-containing alkenyl or amino-containing alkyl.

3. A polymer blend as claimed in claim 2, wherein the polyamine used is an amine of the formula II $$R^4\text{---}NH\text{---}CH_2\text{---}CH_2\text{---}CH_2\text{---}NH_2, \qquad II$$

where R$^4$ is alkyl, alkenyl, aryl, amino-containing alkyl, amino-containing alkenyl or hydrogen.

4. A polymer blend as claimed in any of claim 1, wherein component a) is an α-olefin/maleimide copolymer.

5. A polymer blend as claimed in claim 1, containing from 20 to 75% by weight of component a) and from 25 to 80% by weight of component b).

6. A polymer blend as claimed in claim 1, wherein a copolymer which contains at least the monomers ethylene and vinyl ester is used as component b).

7. A polymer blend as claimed in claim 6, wherein an ethylene/vinyl propionate copolymer is used as component b).

8. A mineral oil distillate containing a polymer blend as claimed in claim 1.

* * * * *